June 10, 1969

T. A. ROGERS 3,448,813

TRACTOR MOUNTED VIBRATING PLOW

Filed Sept. 29, 1966

INVENTOR:

THELMER A. ROGERS

BY:

June 10, 1969 T. A. ROGERS 3,448,813
TRACTOR MOUNTED VIBRATING PLOW
Filed Sept. 29, 1966 Sheet 2 of 2

INVENTOR:

THELMER A. ROGERS
BY: *C. M. McAfee*
    Atty.

United States Patent Office 3,448,813
Patented June 10, 1969

3,448,813
TRACTOR MOUNTED VIBRATING PLOW
Thelmer A. Rogers, P.O. Drawer 1589,
Lubbock, Tex. 79408
Filed Sept. 29, 1966, Ser. No. 583,030
Int. Cl. A01b *11/00*
U.S. Cl. 172—40      23 Claims

ABSTRACT OF THE DISCLOSURE

A gang of deep chisel plows is mounted on a three-point hitch to swing freely horizontally normal to the direction of draft, in which direction the gang is vibrated.

---

This invention relates to earth-working tillage and, more particularly, to a vibrating plow directly mounted upon a tractor.

The desirability of vibratory plows is known. For example, see my prior U.S. Patent No. 3,183,979. Also, much agricultural equipment is now attached to tractors by three-point hitches. Obviously, it would be desirable to vibrate a plow attached to the tractor by a three-point hitch. Prior attempts to do this are shown by Rhoten's U.S. Patent No. 2,641,173 and Saint-Seine's French Patent No. 982,655. However, each of these use a vibration of small amplitude and high frequency, rather than massive vibration of lower frequency and greater amplitude as shown in my prior patent. Italian Patent No. 580,703 illustrates a plow directly attached to the tractor but not by what would commonly be known as a three-point hitch.

A plow according to this invention is attached by the conventional three-point hitch and the vibrator produces massive vibration in the horizontal direction only, with only a small vertical component thereto.

The art of vibratory plows has not been reduced to an exact science. The basic vibration phenomenon is known, but whether any particular embodiment will operate well is not precisely predictable. Field tests show the embodiment of this application works extremely well; however, applicant does not know why it operates better than other machines which have been tested. Also, one of the most serious difficulties in the art is keeping the equipment together. The vibration imposes extreme stress and strain upon the equipment, causing the bolts to loosen, welds to crack, parts to break, etc.

Many of the previous commercially-successful vibrators have used pneumatic tires or gauge wheels as part of the vibrating system, i.e., the tires act as a resilient force to return the mass of the plow back to a neutral position in conjunction with the vibrating force. Tests show that gauge wheels are not essential on this embodiment.

An object of this invention is to provide an ambulatory vibrating earth-working implement.

An object of this invention is to provide a vibratory plow attached to a tractor by a conventional three-point hitch.

Another object is to make such a plow with which the use of pneumatic tires as gauge wheels is optional.

Further objects are to achieve the above with a device that is sturdy, compact, durable, simple, safe, versatile, and reliable, yet inexpensive and easy to manufacture, attach, operate, and maintain.

Still further objects are to achieve the above with a method that is rapid and inexpensive and does not require skilled people to attach, adjust, operate, and maintain.

The specific nature of the invention, as well as other objects, uses, and advantages thereof, will clearly appear from the following description and from the accompanying drawing, the different views of which are not necessarily to the same scale, in which.

Figure 1:
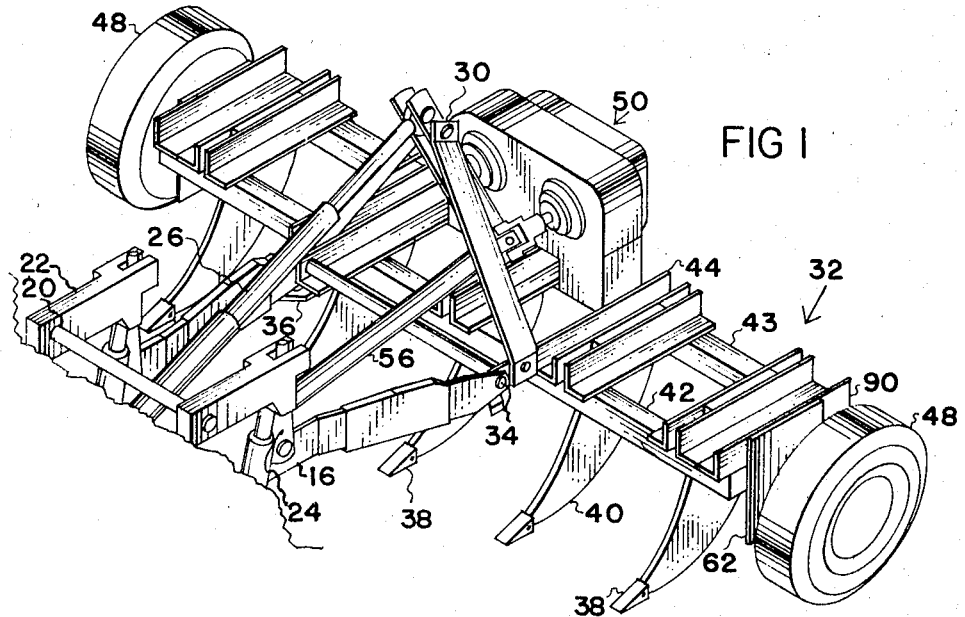
FIG. 1 is a perspective view of an embodiment of this invention.
Figure 2:
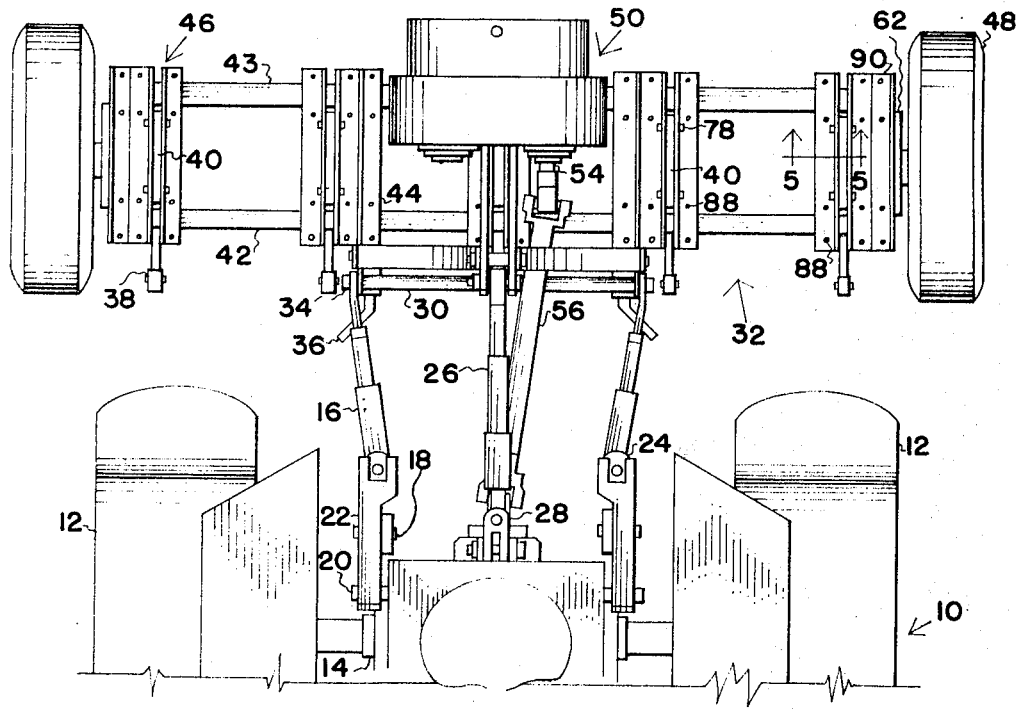
FIG. 2 is a top plan view thereof.
Figure 3:
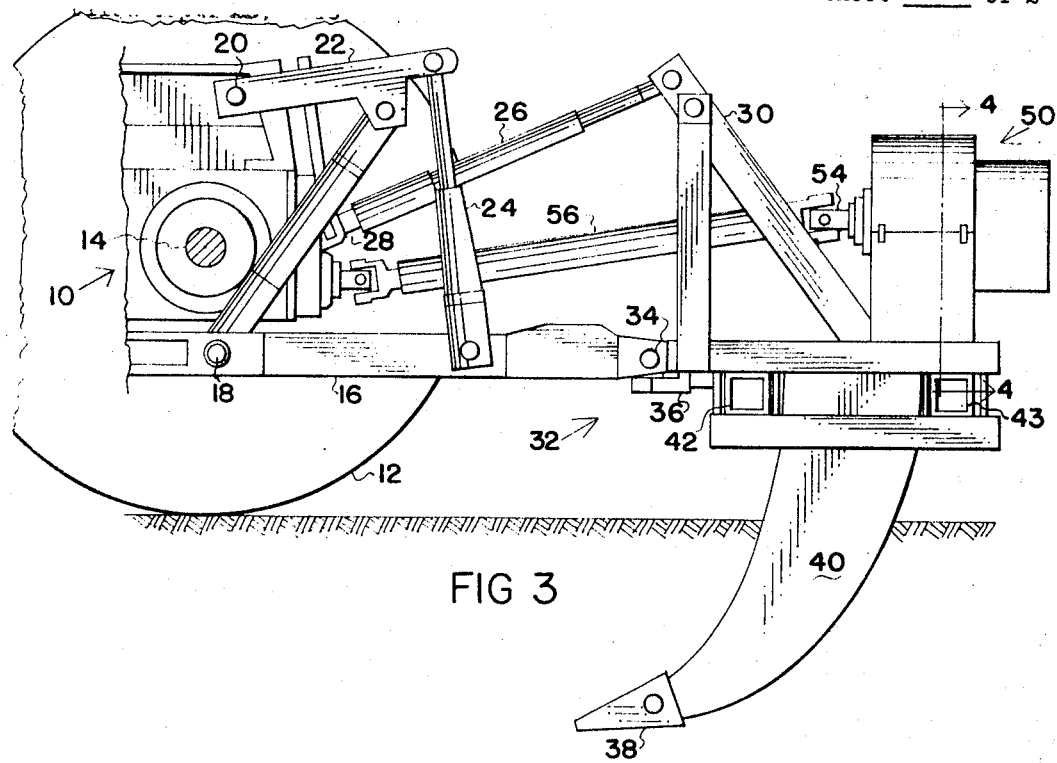
FIG. 3 is a side elevational view of an embodiment without gauge wheels.
Figure 4:
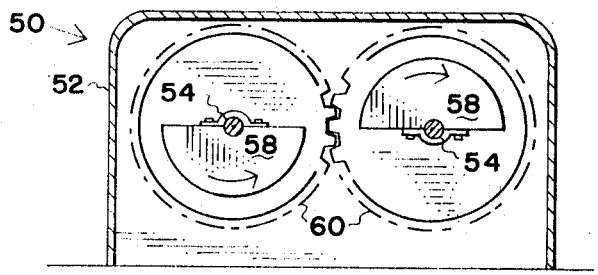
FIG. 4 is a sectional view taken on line 4—4 of FIG. 3 showing the vibrator.
Figure 5:
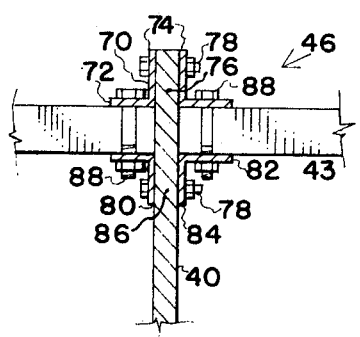
FIG. 5 is a sectional view taken on line 5—5 of FIG. 2 showing details of construction of the frame.

The drawing illustrates a conventional tractor 10 having rear wheels 12 and tractor frame 14. The conventional three-point hitch includes two lower arms 16 which are pivoted to the tractor frame at 18. By themselves, the arms are freely swingable about this pivot point within limits. By within limits, it is meant that the rear ends of the arms 16 are free to swing horizontally four or five inches quite freely and vertically twenty inches or more. The vertical movement of the lower arm 16 is restricted by attachment to power lift mechanism. This includes lift shaft 20 which is journaled to the tractor frame 14. Power lift arms 22 are attached to the ends of the shaft and each is attached by pitman 24 to the lower arm 16. Thus, the vertical position of lower arm 16 is rigidly controlled by the rotation of the power lift shaft 20, as is well known to the art. Thus plow frame 32 attached to lower arms 16 may be forced down and controlled vertically by the power lift arms. The downward direction is called direction of depth and is transverse to the direction of draft. However, this arrangement does not prevent the lower arm 16 from being freely swingable in a horizontal direction, within limits. Stated otherwise, there is lateral play. The third element of the three-point hitch is upper arm 26 which is pivoted to the tractor frame 14 at point 28 and is swingable in any direction. The upper arm 26 is customarily adjustable in length.

The three arms are each pivoted to an A-frame 30 upon plow frame 32. The upper arm 26 is pivoted to the upper point of the A-frame 30 by a pivot which is freely swingable in all directions and the lower arms 16 are pivoted to horns 34 at the lower points of the A-frame by attachments whereby they are fully swingable in all directions. When all three attachments are made, they limit the movement to a certain plane which is substantially parallel to the back of the tractor. However, this depends upon the individual lengths and arrangements and is only approximately true.

Plow frame 32 includes a pair of cantilever bars 36 attached to the frame and extending forward and below each of the horns 34. The purpose of the cantilever bars is to prevent damage to the tractor tires on wheels 12 in the event of failure of the upper arm 26 or one of the pivots of the upper arm 26. Without the cantilever bars 36, should the upper arm 26 or pivot at either end fail, the weight of the plow frame 32 would cause it to swing down, causing point 38 of plow shank 40 to injure the wheels 12. The cantilever bars 36 prevent this occurrence. It may be seen that the plow point 38 is proximate the tractor wheels 12.

The plow frame 32 includes a pair of horizontal bars, forward bar 42 and rear bar 43, normal to the direction of draft. The A-frame 30 is connected thereto by a pair of angle irons or members 44 which are horizontal and aligned with the direction of draft. Sets of horizontal angle members 46 aligned with the direction of draft are used to hold the plow shanks 40 to the frame. Specifically, each of the sets of horizontal angle members 46 includes an upper pair of angle irons 70 with one leg 72 of each flat against the beams 42 and 43. The other leg 74 of each angle iron 70 extends vertically upward facing the other to form slot 76 between the two legs 74.

Lower pair of angle irons 80 has one leg 82 of each flat against the lower side of the beams 42 and 43. The other leg 84 of each extends vertically downward, thereby forming slot 86 therebetween. The slots 76 and 86 are vertically aligned and the upper portion of the plow shank 40 extends within these slots 76 and 86. The plow shank is held securely in place by four bolts 78 extending through the vertical legs 74 and 84. The angle irons are held securely to the horizontal beams by eight bolts 88 which extend through the legs 72 of the upper angle irons 70 and the legs 82 of the lower angle irons 80. Each of the bolts 88 is adjacent to the horizontal beams 42 and 43; therefore, the angle irons 70 and 80, with the bolts 88, form clamps to clamp the sets of angle members 46 to the beams. Additional angle irons 90 are attached at each end of the horizontal beams 42 and 43 whereby the gauge wheels 48 are attached to the frame 32. Thus the earth-working tool in the form of the plow shanks 40 is mounted to the tractor to swing freely horizontally normal to the direction of draft; which direction is called direction of vibration, and which is also normal to the direction of depth.

Vibrator assembly 50 is attached to the rear part of the plow frame 32. The assembly includes housing 52. Two shafts 54 are journaled in the housing 52 generally horizontal and aligned with the direction of the draft. One of the shafts 54 is connected to extensible shaft 56 which is connected to the power takeoff of the tractor 10. Therefore, there is means within the tractor for rotating the shaft 56, thus providing power to the vibrator assembly 50. Each of the shafts 54 has an eccentric weight 58 attached thereto. The weights are timed or arranged upon the shafts 54 so that when one weight is top dead center the other weight is bottom dead center. The shafts 54 each have gear 60 thereon. The gears 60 are of equal diameter and meshed together. Therefore, the shafts 54, carrying their eccentric weights 58, rotate at the same speed in opposite directions. The eccentric weights 58 mounted in the described position will basically produce a horizontal unidirectional vibration in the direction of vibration. There will be no resultant vertical vibration; however, inasmuch as the shafts 54 are spaced apart horizontally, there will be a tendency for one end of the plow to go up while the other end goes down and vice versa. This is called "rocking motion." It is not entirely undesirable. The three-point hitch will tolerate the slight vertical movement resulting from the rocking motion. The hitch, comprising the A-frame 30 and the arms 16 and 26, is near the midpoint of the plow frame 32. Therefore, the vertical component of the ends of the plow frame 32 is minimized at the A-frame.

The eccentric weights 58 are quite heavy, weighing about 60 pounds each, and the center of gravity is spaced about three inches from the center of the shaft. The hitch will accommodate the horizontal and rocking vibration produced, although it will not tolerate a substantial vertical vibration component. I have had good success operating a plow built in accordance with the above description with almost complete isolation of the vibration from the tractor frame 14. It is desirable that the vibration is isolated from the tractor frame.

It will be noted that the plow shanks 40 are the type called "rigid chisel plows." They are quite wide at the top where they attach to the plow frame 32. By wide, I mean they extend for a considerable length in a direction aligned with the direction of draft. They are curved to a rather sharp point at the point 38. The points 38 are located below and forward of the means for attaching the frame to the tractor which is A-frame 30. Furthermore, the points 38 are below and forward of the horns 34 and the points 38 are located in a line which is beneath the arms 16 and 26 and proximate the tractor wheels 12. The rotors, which include the eccentric weights 58 and the shafts 54, are located to the rear of the plow frame 32.

In the event a light tractor 10 is used with a heavy plow frame 32, it is desirable to use gauge wheels 48 on either end of the plow frame 32. These gauge wheels rotate about stub axles which are attached to vertical plates 62. The vertical plates are clamped in an adjustable vertical position to the outside angle irons 90 forming a portion of the plow frame 32. If the gauge wheels 48 are used, they will act as a part of the total vibration system, storing energy at the time that the plow frame is at its maximum displacement and returning the stored energy to cause the plow frame to vibrate back in the opposite direction. However, I have found that they are not essential to the proper operation of the plow. In fact, it is difficult to assess whether the plow operates better with or without the gauge wheels 48. As mentioned above, prior commercial practice considered the gauge wheels to be a necessary part of a vibratory plow system.

I claim as my invention:

1. In a tractor mounted vibratory plow including
   (a) a tractor,
   (b) a plow frame,
   (c) three arms interconnecting the tractor and frame specifically:
   (d) two lower arms which are pivoted to the tractor,
   (e) the two lower arms controllable from the tractor as to vertical raising and lowering, but
   (f) the two lower arms freely swingable horizontally within limits,
   (g) the two lower arms extending in the general direction of the line of draft; and
   (h) one upper arm which is freely swingable both horizontally and vertically within limits,
   (j) the upper arm adjustable in length,
   (k) the three arms pivoted to the plow frame;
   (l) thus the plow frame is mounted for lateral play and
   (m) at least one plow attached to the plow frame,
   (n) the improvement which comprises in combination with the above:
   (o) means attached to the frame for vibrating the frame in substantially a horizontal direction normal to the direction of draft, which is in the direction of said lateral play.

2. The invention as defined in claim 1 with the additional limitation of
   (p) said plow being the sole resilient contact between the frame and the ground.

3. The invention as defined in claim 1 with the additional limitation of
   (p) said plow being a deep chisel plow.

4. The invention as defined in claim 1 with the additional limitation of
   (p) the plow being a deep chisel plow with the point thereof forward of where it is attached to the plow frame and beneath the arms and proximate wheels of said tractor and
   (q) the means for vibrating being located on the rear of the frame.

5. The invention as defined in claim 1 with the additional limitation of
   (p) said means for vibrating being a pair of rotors,
   (q) each rotor mounted for rotation about a shaft generally aligned with the direction of draft, and
   (r) means for rotating the rotors at the same speed in opposite directions,
   (s) each rotor having an eccentric weight thereon in such a position to produce the horizontal vibration, which is in the direction of said lateral play.

6. The invention as defined in claim 5 with the additional limitation of
   (t) said rotors driven by a shaft connected to the power takeoff of the tractor.

7. The invention as defined in claim 5 with the additional limitation of (u) said plow being the sole resilient contact between the frame and the ground.

8. In the invention as defined in claim 5 with the additional limitation of
(t) the plow being a deep chisel plow with the point thereof forward of where it is attached to the frame and beneath the arms, and proximate wheels to said tractor, and
(u) the rotors are located on the rear of the frame.

9. The invention as defined in claim 8 with the additional limitation of
(v) said plow being the sole resilient contact between the frame and the ground.

10. A vibratory plow adapted to be mounted on a tractor comprising in combination:
(a) a forward horizontal beam normal to the direction of draft,
(b) a rear horizontal beam parallel to the forward beam,
(c) a plurality of sets of angle members connecting said horizontal beams,
(d) each set of angle members including:
  (i) an upper pair of angle irons with one leg of each flat against said beams and the other leg of each extending vertically upward facing the other to form a slot therebetween,
  (ii) a lower pair of angle irons with one leg of each flat against said beams and the other leg of each extending vertically downward facing the other to form a slot therebetween,
  (iii) the slot between the legs of the upper pair of angle irons vertically aligned with the slot between the legs of the lower pair of angle irons, and
  (iv) eight bolts, each of the bolts extending from one of the upper angle irons to one of the lower angle irons adjacent one of the horizontal beams,
(e) a plurality of plow shanks,
(f) each plow shank extending downward in one of said slots between the beams and secured in place by bolts through the vertical legs of said angle irons,
(g) means secured to the beams for attaching the plow to a tractor, and
(h) means secured to the beams for vibrating the beams and thus the plow shanks.

11. The invention as defined in claim 10 with the additional limitation of
(j) the plow shanks having points, each of which is below and forward of the forward beam and below and forward of the means for attaching.

12. The invention as defined in claim 10 with the additional limitation of
(j) additional angle irons attached to each end of said horizontal beams, and
(k) gauge wheels attached to said additional angle irons.

13. The invention as defined in claim 10 with the additional limitation of
(j) said means for vibrating being means for primarily vibrating in a horizontal direction aligned with the horizontal beams.

14. The invention as defined in claim 13 with the additional limitation of
(k) a tractor,
(m) three arms interconnecting the tractor and said means for attaching specifically:
(n) two lower arms which are pivoted to the tractor,
(o) the two lower arms controllable from the tractor as to vertical raising and lowering, but
(p) the two lower arms freely swingable horizontally within limits,
(q) the two lower arms extending in the general direction of the line of draft; and
(r) one upper arm which is freely swingable both horizontally and vertically within limits,
(s) the upper arm adjustable in length, and
(t) the three arms pivoted to the means for attaching.

15. In an ambulatory earth-working implement having
(a) a tractor,
(b) an earth-working tool,
(c) arms interconnecting the tractor and earth-working tool,
(d) draft means including said arms for forcing the earth-working tool by the tractor through the earth in a first direction called the direction of draft,
(e) depth means atached to said arms for forcing the earth-working tool against the earth in a second direction called the direction of depth,
(f) said direction of depth transverse to said direction of draft,
(g) the improvement comprising in combination with the above:
(h) said earth-working tool mounted for free swinging movement by said arms in a third lateral direction called the direction of vibration,
(j) said direction of vibration normal to said direction of depth and direction of draft, and
(k) vibratory means attached to the tool for vibrating of the tool unidirectionally lateral in the direction of vibration.

16. The invention as defined in claim 15 with the additional limitation of
(m) said tool being a deep chisel plow.

17. The invention as defined in claim 15 with the additional limitation of
(m) said vibratory means being a pair of rotors,
(n) each rotor mounted for rotation about a shaft generally aligned with the direction of draft, and
(o) means for rotating the rotors at the same speed in opposite directions,
(p) each rotor having an eccentric weight thereon in such a position to produce the unidirectional vibration in the direction of vibration.

18. In a tractor mounted vibratory plow including
(a) a tractor,
(b) a plow frame,
(c) three arms interconnecting the tractor and frame specifically;
(d) two lower arms which are pivoted to the tractor,
(e) the two lower arms controllable from the tractor as to vertical raising and lowering, but
(f) the two lower arms freely swingable horizontally within limits,
(g) the two lower arms extending in the general direction of the line of draft; and
(h) one upper arm which is freely swingable both horizontally and vertically within limits,
(j) the upper arm adjustable in length,
(k) the three arms pivoted to the plow frame;
(l) thus the plow frame is mounted for lateral play, and
(m) at least one deep chisel plow tool attached to the plow frame;
(n) the improved method comprising:
(o) translating the tractor and plow frame in the direction of draft while
(p) biasing the frame in the direction of depth by controlling the vertical raising and lowering of the lower arms from the tractor,
(q) vibrating the frame unidirectionally, horizontally, normal to the direction of draft, which is in the direction of said lateral play.

19. The invention as defined in claim 18 with the additional limitation of
(h) said direction of draft being horizontally orientated, and (j) said direction of depth being vertically orientated.

20. The invention as defined in claim 18 with the additional limitation of
    (h) vibrating the tool by the reaction to the change of direction of movement of at least one weight mounted for movement of the tool.

21. The invention as defined in claim 20 with the additional limitation of
    (j) said direction of draft being horizontally orientated, and
    (k) said direction of depth being vertically orientated.

22. The invention as defined in claim 20 with the additional limitation of
    (j) vibrating the tool by the reaction to the reaction to the rotation of at least two eccentric weights mounted for rotation on the tool, the weights timed to produce the unidirectional vibration in the direction of vibration.

23. The invention as defined in claim 22 with the additional limitation of
    (m) said direction of draft being horizontally orientated, and
    (n) said direction of depth being vertically orientated.

References Cited

UNITED STATES PATENTS

| | | | |
|---|---|---|---|
| 2,850,956 | 9/1958 | Rogers et al. | 172—763 X |
| 3,183,979 | 5/1965 | Rogers | 172—40 |
| 3,286,534 | 10/1966 | Truelock et al. | 172—40 X |
| 3,322,202 | 5/1967 | Van Sickle et al. | 172—413 X |
| 3,349,854 | 10/1967 | Cain et al. | 172—40 |

FOREIGN PATENTS 1,022,404  1/1958  Germany.

ANTONIO F. GUIDA, *Primary Examiner.*

WALTER J. CONLON, *Assistant Examiner.*

U.S. Cl. X.R.

172—669, 763